(No Model.) 2 Sheets—Sheet 1.
F. S. BRECKENRIDGE.
CHECK ROW ATTACHMENT FOR PLANTERS.
No. 600,711. Patented Mar. 15, 1898.
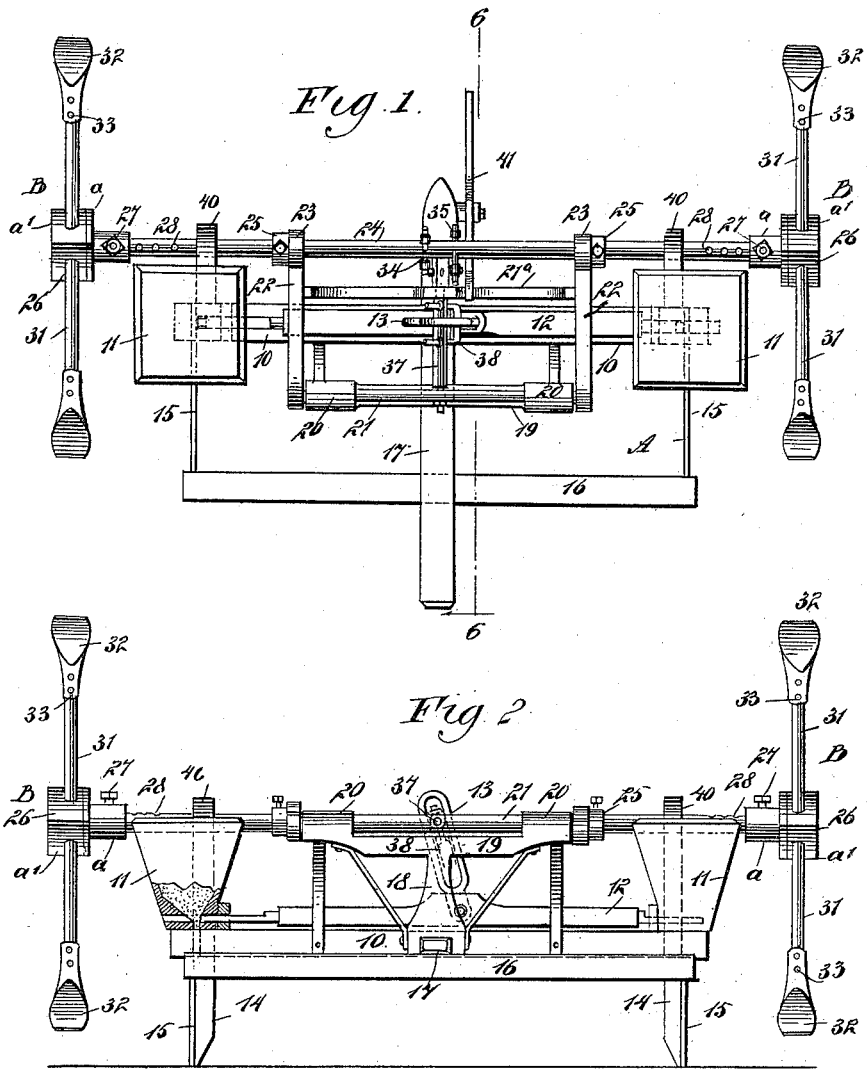
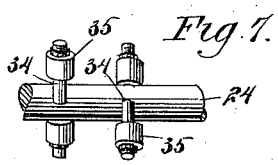
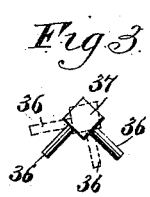
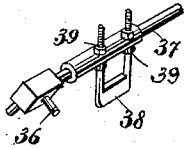
WITNESSES:
INVENTOR
F. S. Breckenridge
BY
ATTORNEYS.

(No Model.)
F. S. BRECKENRIDGE.
CHECK ROW ATTACHMENT FOR PLANTERS.
No. 600,711. Patented Mar. 15, 1898.
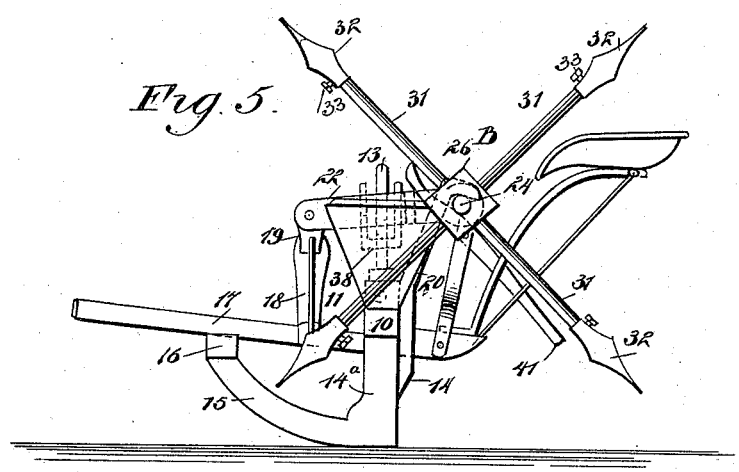
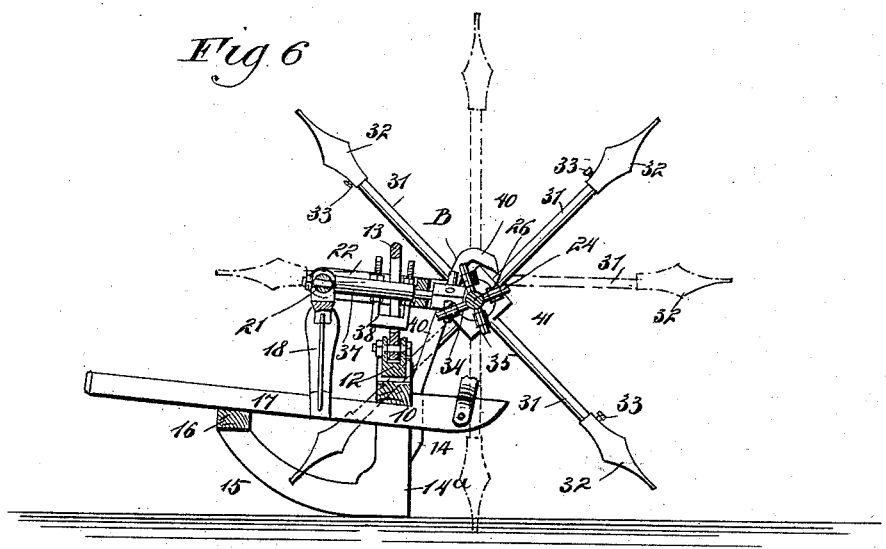
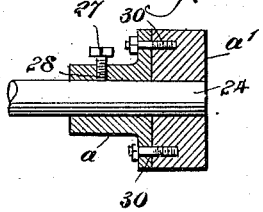
INVENTOR
F. S. Breckenridge
BY
ATTORNEYS.

UNITED STATES PATENT OFFICE.

FIRMAN S. BRECKENRIDGE, OF CALEDONIA, MISSOURI.

CHECK-ROW ATTACHMENT FOR PLANTERS.

SPECIFICATION forming part of Letters Patent No. 600,711, dated March 15, 1898.

Application filed May 27, 1897. Serial No. 638,324. (No model.)

*To all whom it may concern:*

Be it known that I, FIRMAN SMITH BRECKENRIDGE, of Caledonia, in the county of Washington and State of Missouri, have invented a new and Improved Check-Row Attachment for Planters, of which the following is a full, clear, and exact description.

The object of my invention is to provide a check-row attachment especially adapted for corn-planters and to construct the attachment in a simple, durable, and economic manner and so that the attachment may be readily applied to a planter of any description.

Another object of the invention is to provide means for adjusting the markers, so that the rows may be checked at any desired distance apart and with great accuracy.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the attachment applied to a planter. Fig. 2 is a front elevation of the planter and attachment, a portion of the planter being in section. Fig. 3 is an end view of the tumbler-shaft of the attachment. Fig. 4 is a perspective view of the tumbler-shaft. Fig. 5 is an end view of the planter and the check-row attachment, the latter being shown elevated. Fig. 6 is a vertical section taken on the line 6 6 of Fig. 1. Fig. 7 is a detail view of a portion of the marker-shaft, showing the attachment thereto of trip-pins. Fig. 8 is a transverse section through the marker-shaft, illustrating in detail the construction of the hub of one of the markers; and Fig. 9 is a vertical section through the hub shown in Fig. 8.

The planter as illustrated consists of a back or main cross bar or beam 10, upon which the seedboxes 11 are located and over which the drop-slide 12 has movement, and chutes 14, arranged for the delivery of the seed, located adjacent to runners 15, which connect the rear or main beam 10 with a front beam 16, to which the pole or tongue 17 is secured. The pole or tongue 17 extends beyond the rear of the beam, and suitable side pieces 14ª are attached to the ends of the main beam with which the runners are connected.

An upright 18 is secured to the pole 17 between the cross-bars 10 and 16, the said upright forming a portion of or being attached to a cross-head 19, having a bearing 20 formed at each of its ends. A shaft 21 is journaled in the bearings 20, and arms 22 are secured to the extremities of the shaft 21, which arms are carried rearward and terminate in eyes or similar bearings 23, as shown particularly in Fig. 1. The main or marking-wheel shaft 24 is journaled in the bearings or eyes 23, as shown particularly in Fig. 1, and said shaft is held against end movement by means of collars 25, secured to the shaft outside of its bearings or eyes 23.

A marking-wheel B is secured to each end of the marking-shaft 24, the said shaft being of sufficient length to extend well beyond the sides of the frame. The hub 26 of each marking-wheel is preferably made in two sections $a$ and $a'$. (Shown in Figs. 8 and 9.) The inner section $a$ of the hub is adjustably secured by means of set-screws 27 to the shaft, the said screws being adapted to enter any one of a number of longitudinally-arranged recesses 28. The inner section of the hub of each marking-wheel is also provided with slots 29, (shown in Fig. 8,) and through these slots bolts 30 are passed into the outer section $a'$ of said hub, as illustrated in Fig. 9, each bolt carrying a suitable nut. The object of making the hubs of the marking-wheels in adjustable sections is to enable the arms 31, which radiate from the hubs, to be brought in parallelism with corresponding arms on an opposing wheel. Each arm 31 of a wheel is provided with a point 32, preferably in the form of a paddle, and these points are adjustably secured to the said arms through the medium of set-screws 33 or equivalent fastening devices.

At each side of the center of the marking-shaft 24 trip-pins 34 are secured. These pins pass through the shaft and are at right angles to each other, each pin at each end being provided with a friction-roller 35, as shown in Fig. 7. The rollers of the trip-pins 34 are adapted for engagement with projections 36 from the tumbler-shaft 37, the said projections being at acute angles to one another, extending from opposite sides of the shaft, and in fact these projections constitute the sides of a right-angled triangle. A tumbler 38, which is preferably U-shaped, as shown in Fig. 4, is used in connection with said shaft 37. The tumbler extends downward from the shaft 37, and its members are threaded and carried through the shaft and provided with nuts 39 above and below said shaft. Under this construction the tumbler 38 may be adjusted, and by raising or lowering the tumbler the stroke of the seed-drop slide will be regulated.

The tumbler-shaft 37, as shown in Fig. 1, is journaled at one of its ends in the shaft 21 at the front of the frame, the projections 36 being at the rear end of the tumbler-shaft, and the tumbler-shaft is also journaled in a cross-bar 21ª, which extends through one arm 22 to the other parallel with the shaft 21. Arms 40 are carried upward from the rear or main cross-bar 10 of the standard near each of its ends, and these arms are curved rearwardly at their upward extremities over the wheel-shaft and limit the upward movement of the same. The arms 40 also serve to force the marker-wheel points in the ground equally as deep as the runners go, so that variation of the surface of the ground will not cause them to run irregularly. A lever 41 is pivoted at the rear end of the tongue 17, the said lever being arranged for engagement with the wheel-shaft and is capable of raising the same, since the shaft 21 serves as a pivot for the forward portions of the arms 22, supporting said shaft.

A vertical link 13 is pivoted at its lower end in the central portion of the seed-drop slide, as illustrated in Fig. 2. The tumbler-shaft passes loosely through this link, and the tumbler 38 is arranged to engage with its side surfaces. Therefore as the points of the marker enter the ground and the marking-shaft 24 is revolved the trip-pins 34 of this shaft will engage with the projections 36 of the tumbler-shaft, rocking this latter shaft alternately to the right and to the left, causing the tumbler 38 to give corresponding movement to the seed-drop slide through the medium of the link 13.

The distance between the rows is regulated by adjusting the marking-points upon the wheel-arms and also by adjusting the wheels upon the shaft 24. The wheels are to be so regulated on the marking-wheel shaft that when the machine is in motion and the wheels travel upon the ground the points entering the ground will disturb the earth or make depressions therein that can be readily seen by the driver.

The trip device for the seed-drop slide, it will be observed, is so constructed as to cause the seed to be dropped in line between the depressions made by the marker. Thus when the planter is driven across the field and turned, placing one point of a wheel in the last hole or depression made by a marking-point when the machine is drawn back across the field, the marker placed in position will follow the depressions made by the outer marker while the machine was previously traveling across the field, and the wheel at the opposite side of the machine will also make a row of holes or depressions to be entered or checked by the marker when the machine is again turned, thereby rendering it possible to produce the rows parallel both ways.

This check-row attachment can be applied to any two-horse corn-planter and equally as well to a planter having a revolving seed-drop as to a planter provided with a reciprocating slide.

Having thus described my invention, I claim as new and desire to secure by Letters Patent—

1. In a check-row attachment for planters, a marking-wheel shaft, marking-wheels adjustable longitudinally on said shaft, and points adjustable longitudinally on the arms of the wheel.

2. In a check-row attachment for planters, a marking-wheel having its hub constructed in adjustable sections, one section being capable of turning upon the other, fastening devices for the said sections of the hub, and arms projected from the hub.

3. In a check-row attachment for planters, a marking-wheel comprising a hub constructed in sections capable of adjustment one upon the other, locking devices for said sections, arms projected from one of the sections of the hub, and points adjustable upon said arms.

4. In a check-row attachment for planters, the combination, with the seed-drop slide, a link projected therefrom, a support and arms having a pivoted connection with the said support, of a shaft provided with marking-wheels, a tumbler-shaft passed through said link and supported between the said pivoted arms, a projection from the shaft located within said link, and a trip mechanism between the wheel-shaft and the tumbler-shaft.

5. The combination, with a planter, a support secured thereto, a drop-slide, arms pivoted to said support and extending over the drop-slide, a tumbler-shaft held to rock between said arms, a link through which the tumbler-shaft passes, the said link being connected with the drop-slide, a tumbler projecting from the said tumbler-shaft, located within said link and arranged for engagement with its sides, and extensions from one portion of said tumbler-shaft, said extensions being at angles to one another, of a shaft, marking-wheels carried by said shaft, the shaft being journaled in the aforesaid pivoted arms, and trip-pins carried by the shaft, placed at angles to one another and arranged for engagement with the extensions of the tumbler-shaft, whereby the said tumbler-shaft is rocked alternately to the right and to the left as the said marking-wheels are carried over the ground.

FIRMAN S. BRECKENRIDGE.

Witnesses:
D. M. QUEEN,
EMMETT WILLIAMS.